United States Patent [19]
Yoon

[11] Patent Number: 5,822,000
[45] Date of Patent: Oct. 13, 1998

[54] VIDEO ENCODING USING REARRANGEMENT OF TRANSFORM COEFFICIENTS AND INTER-BLOCK CORRELATION

[75] Inventor: Sung-Wook Yoon, Seoul, Rep. of Korea

[73] Assignee: Daewoo Electronics, Co., Ltd., Seoul, Rep. of Korea

[21] Appl. No.: 769,835

[22] Filed: Dec. 20, 1996

[30] Foreign Application Priority Data

Dec. 23, 1995 [KR] Rep. of Korea ................. 95-55655

[51] Int. Cl.$^6$ ..................................... H04N 7/30
[52] U.S. Cl. ............................. 348/403; 348/420
[58] Field of Search ..................... 348/403, 404, 348/405, 390, 384, 409, 415, 420; H04N 7/133

[56] References Cited

U.S. PATENT DOCUMENTS

| | | | |
|---|---|---|---|
| 5,045,938 | 9/1991 | Sugiyama | 348/408 |
| 5,329,318 | 7/1994 | Keith | 348/402 |
| 5,369,439 | 11/1994 | Matsuda et al. | 348/405 |

FOREIGN PATENT DOCUMENTS

| | | |
|---|---|---|
| 0 492 537 | 7/1992 | European Pat. Off. |
| 88/10049 | 12/1988 | WIPO |
| 95/15531 | 6/1995 | WIPO |

*Primary Examiner*—Bryan Tung
*Attorney, Agent, or Firm*—Pennie & Edmonds LLP

[57] ABSTRACT

A frame of a video signal, wherein the frame is divided into non-overlapping blocks of M×N pixels, M and N being positive integers, respectively, is encoded by: arranging the blocks into groups of P×Q blocks, P and Q being positive integers, respectively; transforming each of the P×Q blocks in a group into a set of M×N transform coefficients by using a predetermined transform method, to thereby provide P×Q sets of M×N transform coefficients for the group, the transform coefficients in a set representing different frequency components; rearranging the P×Q sets of M×N transform coefficients to generate M×N sets of P×Q rearranged coefficients, the rearranged coefficients in a set being of an identical frequency component; and setting M×N sets of P×Q rearranged coefficients as encoded data for the group of P×Q block.

19 Claims, 3 Drawing Sheets

FIG.2

| C(1,1) | C(1,2) | C(1,6) | C(1,7) | C(2,1) | C(2,2) | C(2,6) | C(2,7) |
| --- | --- | --- | --- | --- | --- | --- | --- |
| C(1,3) | C(1,5) | C(1,8) | C(1,13) | C(2,3) | C(2,5) | C(2,8) | C(2,13) |
| C(1,4) | C(1,9) | C(1,12) | C(1,14) | C(2,4) | C(2,9) | C(2,12) | C(2,14) |
| C(1,10) | C(1,11) | C(1,15) | C(1,16) | C(2,10) | C(2,11) | C(2,15) | C(2,16) |
| C(3,1) | C(3,2) | C(3,6) | C(3,7) | C(4,1) | C(4,2) | C(4,6) | C(4,7) |
| C(3,3) | C(3,5) | C(3,8) | C(3,13) | C(4,3) | C(4,5) | C(4,8) | C(4,13) |
| C(3,4) | C(3,9) | C(3,12) | C(3,14) | C(4,4) | C(4,9) | C(4,12) | C(4,14) |
| C(3,10) | C(3,11) | C(3,15) | C(3,16) | C(4,10) | C(4,11) | C(4,15) | C(4,16) |

| | RB1 | | RB2 | | RB3 | | RB4 | | | | | | | |
|---|---|---|---|---|---|---|---|---|---|---|---|---|---|---|
| C(1,1) | C(2,1) | C(1,2) | C(2,2) | C(1,3) | C(2,3) | C(1,4) | C(2,4) | C(1,8) | C(2,8) | C(1,12) | C(2,12) | C(1,16) | C(2,16) |
| C(3,1) | C(4,1) | C(3,2) | C(4,2) | C(3,3) | C(4,3) | C(3,4) | C(4,4) | C(3,8) | C(4,8) | C(3,12) | C(4,12) | C(3,16) | C(4,16) |
| C(1,5) | C(2,5) | C(1,6) | C(2,6) | C(1,7) | C(2,7) | | | | | | | | |
| C(3,5) | C(4,5) | C(3,6) | C(4,6) | C(3,7) | C(4,7) | | | | | | | | |
| C(1,9) | C(2,9) | C(1,10) | C(2,10) | C(1,11) | C(2,11) | C(1,15) | C(2,15) | | | | | | |
| C(3,9) | C(4,9) | C(3,10) | C(4,10) | C(3,11) | C(4,11) | C(3,15) | C(4,15) | | | | | | |
| C(1,13) | C(2,13) | C(1,14) | C(2,14) | | | | | | | | | | |
| C(3,13) | C(4,13) | C(3,14) | C(4,14) | | | | | | | | | | |

(Figure 3 shows a grid arrangement of cells labeled C(i,j) organized into blocks RB1–RB16.)

1

VIDEO ENCODING USING REARRANGEMENT OF TRANSFORM COEFFICIENTS AND INTER-BLOCK CORRELATION

FIELD OF THE INVENTION

The present invention relates to a method and apparatus for encoding a video signal; and, more particularly, to an encoder capable of improving the coding efficiency based on the correlation between blocks of pixels in a video frame.

DESCRIPTION OF THE PRIOR ART

As is well known, transmission of digitized video signals can deliver video images of much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data through the limited channel bandwidth, it is necessary to compress or reduce the volume of the transmission data.

The image signal can be normally compressed without seriously affecting its integrity because there usually exist certain correlationships or redundancies among some of the pixels in a single frame and also among those of neighboring frames. Accordingly, most of prior art image signal encoding methods employ various compression techniques built on the idea of utilizing or truncating the redundancies.

One category of such coding methods relates to transform techniques which take advantage of the redundancies existing in a single frame; and includes orthogonal transform methods which convert a block of digital image data into a set of transform coefficients, e.g., a two-dimensional Discrete Cosine Transform (DCT).

Specifically, in the orthogonal transform method such as DCT (discrete cosine transform) or the like, a frame of video signals is divided into equal-sized non-overlapping blocks, for example, blocks of 8×8 pixels, and each of the blocks is transformed from the spatial domain to the frequency domain. As a result, a set of transform coefficients including one DC coefficient and a plurality of(e.g., 63) AC coefficients is obtained for each block. The transform coefficients in a set represent amplitudes of respective frequency components of the pixels in a block, and, in particular, the DC coefficient of the block reflects the average intensity of the pixels in the block, while the AC coefficients represent intensities of the spatial frequency components of the pixels.

The transform coefficients are then quantized based on a predetermined quantization matrix and a quantizer scale, wherein the quantizer scale may be determined for every macroblock which includes a predetermined number of, e.g., four, blocks, based on, e.g., an activity of an input video signal and an amount of data stored in a transmission buffer. By processing such quantized transform coefficients with a statistical coder employing, e.g., variable length coding (VLC), the amount of data to be transmitted can be effectively compressed.

However, such conventional coding schemes described above merely utilize spatial redundancies within a block, without due regard to paying to correlations between blocks in a video frame.

SUMMARY OF THE INVENTION

It is, therefore, an object of the present invention to provide a method and apparatus capable of improving the coding efficiency by taking advantage of spatial redundancies among neighboring blocks in a video frame.

In accordance with the present invention, there is provided a method for encoding a frame of a video signal, wherein the frame is divided into non-overlapping blocks of M×N pixels, M and N being positive integers, respectively, comprising the steps of:

arranging the blocks into groups of P×Q blocks, P and Q being positive integers, respectively;

transforming each of the P×Q blocks in a group into a set of M×N transform coefficients by using a predetermined transform method, to thereby provide P×Q sets of M×N transform coefficients for the group, said transform coefficients in a set representing different frequency components, respectively;

rearranging the P×Q sets of M×N transform coefficients to generate M×N sets of P×Q rearranged coefficients, the rearranged coefficients in a set being of an identical frequency component; and setting M×N sets of P×Q rearranged coefficients as encoded data for the group of P×Q blocks.

BRIEF DESCRIPTION OF THE DRAWINGS

The above and other objects and features of the present invention will become apparent from the following description of preferred embodiments given in conjunction with the accompanying drawings, in which:

FIG. 2 illustrates sets of transform coefficients; and

FIG. 3 represents sets of rearranged coefficients.

DETAILED DESCRIPTION OF THE PREFERRED EMBODIMENTS

Figure 1:
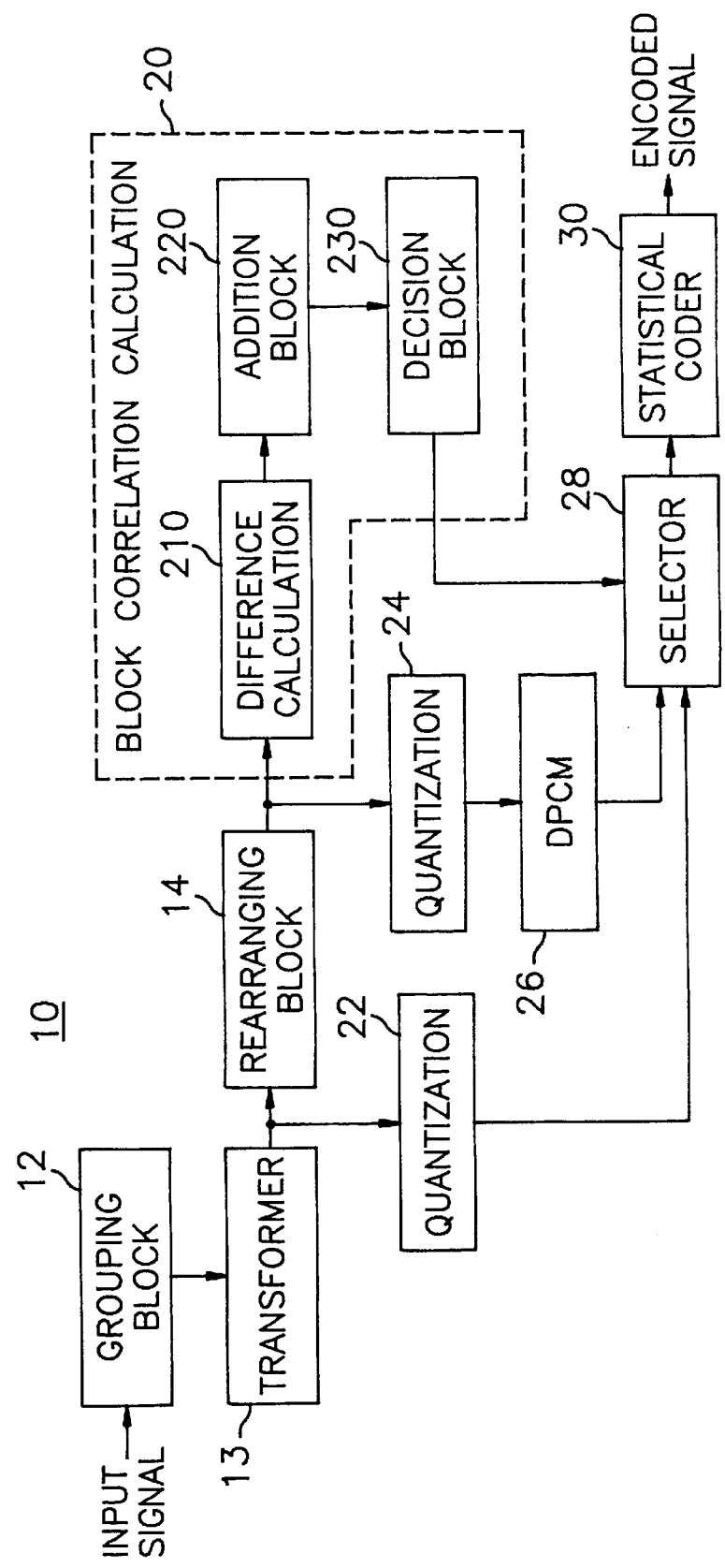
FIG. 1 shows a block diagram of an encoding device in accordance with a preferred embodiment of the present invention.

In FIG. 1, there is illustrated a block diagram of an encoding apparatus 10 in accordance with a preferred embodiment of the present invention, which includes a grouping block 12, a transformer 13, a rearranging block 14, a block correlation calculation block 20, a first quantization block 22, a second quantization block 24, a DPCM (differential pulse code modulation) block 26, a selector 28, and a statistical coder 30.

An input signal of a video frame is fed to the grouping block 12, wherein the video frame is divided into equal-sized non-overlapping blocks of M×N, e.g., 8×8, pixels and 2×2 neighboring blocks constitute a macroblock, M and N being positive integers, respectively. At the grouping block 12, the blocks are arranged into groups of P×Q blocks, P and Q being positive integers, respectively. In a preferred embodiment of the invention, both P and Q are set to 2. That is, 2×2 sets of pixels which correspond to 2×2 blocks included in a macroblock are arranged as a group, each set including M×N pixels.

The transformer 13, which converts, by using e.g., DCT, pixel data of the input signal from the spatial domain into the frequency domain, generates for each of the P×Q blocks in a group, fed thereto from the grouping block 12, a set of M×N transform coefficients, each transform coefficient representing an amplitude of a frequency component.

Referring to FIG. 2, there is illustrated a group of transform coefficients having P×Q, e.g., 2×2, sets of transform coefficients B1 to B4 wherein for the sake of simplicity, both M and N are assumed to be 4; and, therefore, a set of transform coefficients includes 4×4 transform coefficients therein. In FIG. 2, a transform coefficient C(i,j) represents a j-th frequency component in an i-th set of transform coefficients, wherein i=1, 2, . . . , I(=P×Q); j=1, 2, . . . , J(=M×N); and a frequency component corresponding to a transform coefficient of a greater index j value is higher than that corresponding to a transform coefficient of a smaller index j value. For instance, C(1, 12) represents a transform coefficient corresponding to a 12th frequency component of a first set B1; C(i,1), a DC transform coefficient in an i-th set; C(i,16), an AC transform coefficient of a highest frequency in the i-th set; and each set Bi includes transform coefficients C(i,1) to C(i,16). Each group of transform coefficients is provided to the rearranging block 14 and the first quantization block 22.

The first quantization block 22 converts the P×Q sets of M×N transform coefficients in a group into P×Q quantized sets of transform coefficients through the use of a conventional quantization method, wherein the quantization of a set of transform coefficients is carried out based on a preset quantization matrix and a quantizer scale determined for a macroblock. The quantized sets of transform coefficients are provided to the selector 28. It should be noted that DC coefficients included in the sets of transform coefficients are DPCM coded as in a conventional encoder in case the input signal is of an intra-mode.

At the rearranging block 14, P×Q sets of M×N transform coefficients in a group is rearranged to provide M×N sets of P×Q rearranged coefficients, wherein P×Q rearranged coefficients in a set are of an identical frequency component. Referring to FIG. 3, there are depicted M×N sets of P×Q rearranged coefficients of an identical frequency component taken out from the set of transform coefficients B1 to B4 shown in FIG. 2. That is, a j-th set of rearranged coefficients RBj is composed of transform coefficients C(i,j) having the identical index j. For instance, RB1 includes coefficients C(1,1) to C(4,1); RB10, C(1,10) to C(4,10) and the like. The M×N sets of P×Q rearranged coefficients for each group are provided to the block correlation calculation block 20 and the second quantization block 24.

The second quantization block 24 quantizes M×N sets of P×Q rearranged coefficients for each group in a similar manner as in the first quantization block 22 to thereby provide M×N quantized sets of rearranged coefficients QB1 to QBj, wherein QBj represents a quantized set of rearranged coefficients obtained from the set of rearranged coefficients RBj. The quantized sets of rearranged coefficients for the group are coupled to the DPCM block 26, which calculates the differences between the neighboring rearranged coefficients within each quantized set by using a conventional DPCM technique and generates a set of DPCM coefficients defined as: D(i,j)=QC(i,j)−QC((i−1),j), wherein D(i,j) is an i-th DPCM coefficient in a j-th set of DPCM coefficients; QC(i,j) and Q(i−1,j) are an i-th and an (i−1)st coefficients in the quantized set QBj, respectively; and QC(0,j) is set to zero. The M×N sets of P×Q DPCM coefficients are provided from the DPCM block 26 to the selector 28.

The block correlation calculation block 20 includes a difference calculation block 210, an addition block 220, and a decision block 230. The block correlation calculation block 20 assesses correlations among P×Q blocks corresponding to a group of transform coefficients, based on the sets of rearranged coefficients for the group provided from the rearranging block 14; and generates a selection signal to the selector 28.

In accordance with the preferred embodiment of the invention, the difference calculation block 210 calculates differences between the rearranged coefficients included in each set of rearranged coefficients in a similar fashion as in the DPCM block 26; and generates a set of difference values for each set of rearranged coefficients. The difference values may be defined as:

$$E(i,j)=|C(i,j)-C(i-1,j)|$$

or $$E(i,j)=\{C(i,j)-C(i-1,j)\}^2,$$

wherein E(i,j) is an i-th difference value in a j-th set of difference values; C(i,j) and C(i−1,j) are an i-th and an (i−1)st rearranged coefficients in the set of rearranged coefficients RBj, respectively; and C(0,j) is defined as zero.

In another preferred embodiment of the invention, the difference values are determined by considering weight factors thereto, defined as:

$$E(i,j)=w(j)\cdot|C(i,j)-C(i-1,j)|$$

or $$E(i,j)=w(j)\cdot\{C(i,j)-C(i-1,j)\}^2,$$

wherein E(i,j), C(i,j) and C(i−1, j) are identical to those defined above; and w(j) ia a weight factor having a smaller value for a greater value of an index j.

The calculated difference values are then coupled to the addition block 220, wherein the difference values of a set are added together to provide a sum of difference values for a set of rearranged coefficients. The sum of difference values in a j-th set may be defined as:

$$S(j)=\sum_{i=1}^{I} E(i,j).$$

The sums of the difference values S(1) to S(I) for a group of rearranged coefficients are then fed to the decision block 230 to be utilized in determining the degree of correlation between the transform coefficients in the group. The decision block 230 assesses the degree of correlation in accordance with a predetermined decision criterion which will be described hereinafter, based on the sums of the difference values coupled thereto from the addition block 220. That is, if it is determined that the degree of correlation is high, the decision block 230 generates a first selection signal; and, otherwise, a second selection signal is generated therefrom.

Referring to the decision criterion for assessing the degree of correlation, the degree of correlation may be defined as:

$$DEG=\frac{1}{J}\cdot\sum_{j=1}^{J} S(j)$$

in accordance with a preferred embodiment of the invention. That is, the degree of correlation is obtained by averaging all the sums S(1) to S(J). In a second preferred embodiment of the invention, the degree of correlation may be determined based on the average of the sums for selected sets of difference values which correspond to lower frequency components. In such an instance, the degree of correlation may be defined as:

$$DEG = \frac{1}{K} \cdot \sum_{j=1}^{K} S(j)$$

with K being smaller than J, the total number of sets of difference values. In the first and the second embodiment, the degree of correlation is considered to be high if DEG is smaller than a predetermined threshold TH0; and the first selection signal is generated by the decision block 230; and, if otherwise, the second selection signal is issued therefrom.

In a third preferred embodiment of the invention, each of the S(j)'s, S(1) to S(J), is compared with a preset threshold TH1. If the number of S(j)'s which are smaller than TH1 is larger than a preset number K2, the degree of correlation is determined as to be high or considerable. Similarly, as in the first and the second embodiments, if the degree of correlation is regarded to be high or considerable, the first selection signal is provided by the decision block 230; and otherwise, the second selection signal is generated therefrom.

The selection signal, generated from the decision block 230, controls the selector 28 to select between the output provided from the first quantization block 22 and the one from the DPCM block 26. That is, if the first selection signal is inputted thereto, the M×N sets of P×Q DPCM coefficients from the DPCM block 26 are selected; and, if the second selection signal is received, the P×Q quantized sets of M×N transform coefficients from the first quantization block 22 is selected by the selector 28. The selected data is then fed to the statistical coder 30.

At the statistical coder 30, the selected data from the selector 28 is encoded through the use of conventional statistical coding schemes such as RLC (run-length coding) and VLC (variable length coding). The encoded signal is then provided to a transmitter (not shown) for the transmission thereof.

Although only the application of the present invention to the video image signal has been described hereto, it can also be applied to a difference signal representing displacement between frames of data.

In the preferred embodiments of this invention explained hereto, the grouping size is set to P×Q. However, this can be varied by grouping the blocks having an identical quantizer scale. For example, if a plurality of macroblocks has a same quantizer scale assigned thereto, these macroblocks can be grouped together.

Furthermore, while the present invention has been described with respect to certain preferred embodiments only, other modifications and variations can be made without departing from the spirit and scope of the present invention as set forth in the following claims.

What is claimed is:

1. A method for encoding a frame of a video signal, wherein the frame is divided into non-overlapping blocks of M×N pixels, M and N being positive integers, respectively, comprising the steps of:

(a) arranging the blocks into groups of P×Q blocks, P and Q being positive integers, respectively;

(b) transforming each of the P×Q blocks in a group into a set of M×N transform coefficients by using a predetermined transform method, to thereby provide P×Q sets of M×N transform coefficients for the group, said transform coefficients in a set representing different frequency components, respectively;

(c) rearranging the P×Q sets of M×N transform coefficients to generate M×N sets of P×Q rearranged coefficients, the rearranged coefficients in a set being of an identical frequency component;

(d) setting M×N sets of P×Q rearranged coefficients as encoded data for the group of P×Q block;

(e) calculating difference values between the rearranged coefficients in each set to thereby provide sets of difference values;

(f) determining, based on the sets of difference values, whether the degree of correlations among the blocks in the group is high or low;

(g) if the degree of correlations is determined to be low, updating the encoded data with the P×Q sets of M×N transform coefficients, if the degree of correlations is high, the encoded data is the M×N sets of P×Q rearranged coefficients and, if otherwise, the encoded data is the P×Q sets of M×N transform coefficients; and (h) generating coded data based on the encoded data, wherein if the encoded data is the sets of transform coefficients, the encoded data is quantized to provide P×Q quantized sets of M×N transform coefficients as the coded data and if the encoded data is the sets of rearranged coefficients, the encoded data is quantized to provide M×N quantized sets of P×Q rearranged coefficients and each quantized set of rearranged coefficients is DPCM (differential pulse code modulation) coded to thereby provide M×N sets of P×Q DPCM coefficients as the coded data.

2. The method according to claim 1 wherein both M and N are 8 and both P and Q are equal to 2.

3. The method according to claim 1, further comprising, after the generating step (h), the step (i) of statistically coding the coded data.

4. The method according to claim 3, wherein said transforming step (b) is carried out by using a DCT (discrete cosine transform) method and said statistically coding step (i) is performed using of a RLC (run-length coding) and a VLC (variable length coding) techniques.

5. The method according to claim 1, wherein a transform coefficient is expressed as C(i,j) representing the transform coefficient corresponding to a j-th frequency component in an i-th set of transform coefficients and the P×Q rearranged C(i,j)'s included in a j-th set have an identical index j, and said i being a positive integer ranging from 1 to I(=P×Q), j being a positive integer ranging from 1 to J(=M×N).

6. The method according to claim 5, wherein said difference values are defined by an equation selected from the group consisting of:

$E(i,j)=|C(i,j)-C(i-1,j)|,$ $E(i,j)=\{C(i,j)-C(i-1,j)\}^2,$ $E(i,j)=w(j)\cdot|C(i,j)-C(i-1,j)|,$ and $E(i,j)=w(j)\cdot\{C(i,j)-C(i-1,j)\}^2,$ wherein E(i,j) is an i-th difference value in a j-th set of difference values, w(j) is a weight factor and C(0,j) is set to zero.

7. The method according to claim 6, wherein said weight factor w(j) is equal to or smaller than w(j−1).

8. The method according to claim 7, wherein said determining step (f) includes the steps of:

(f1) providing a sum of difference values included in each set, a sum S(j) for a j-th set of difference values being defined as $$S(j) = \sum_{i=1}^{I} E(i,j);$$

(f2) calculating the degree of correlation DEG defined as $$DEG = \frac{1}{K} \cdot \sum_{j=1}^{K} S(j),$$

K being a positive integer equal to or smaller than J;

(f3) comparing the degree of correlation DEG with a predetermined threshold value TH0; and (f4) if DEG is smaller than TH0, determining the degree of correlations to be high; and deciding the degree of correlations to be low, if otherwise.

9. The method according to claim 7, wherein said determining step (f) includes the steps of:

(f5) providing a sum of difference values included in each set, a sum S(j) for a j-th set of difference values being defined as $$S(j) = \sum_{i=1}^{I} E(i,j);$$

(f6) comparing sums S(1) to S(K) with a preset threshold TH1, K being a positive integer not greater than J(=M× N);

(f7) obtaining the number of sums, which are smaller than TH1; and (f8) if the number of sums is greater than a preset number, determining that the degree of correlations is high; and, if otherwise, determining that the degree of correlations is low.

10. A method for encoding a frame of a video signal, wherein the frame is divided into non-overlapping blocks of M×N pixels, M and N being positive integers, respectively; the method comprising the steps of:

(a) arranging the blocks into groups of P×Q blocks, P and Q being positive integers, respectively;

(b) transforming each of the P×Q blocks in a group into a set of M×N transform coefficients, to thereby provide P×Q sets of M×N transform coefficients C(i,j)'s for the group, a transform coefficient representing the one corresponding to a j-th frequency component in an i-th set of transform coefficients and a greater index j representing a frequency component of a higher frequency with i=1, . . . ,(=P×Q) and j=1 to J(=M×N);

(c) quantizing the sets of transform coefficients into P×Q quantized sets of M×N transform coefficients;

(d) rearranging the P×Q sets of M×N transform coefficients to generate M×N sets of P×Q rearranged coefficients, the P×Q rearranged coefficients C(i,j)'s included in a j-th set having an identical index j;

(e) quantizing the sets of rearranged coefficients into M×N quantized sets of P×Q rearranged coefficients;

(f) DPCM (differential pulse code modulation) coding the sets of quantized sets of rearranged coefficients to provide M×N sets of DPCM coefficients;

(g) calculating difference values for each set of rearranged coefficients generated in step (d) to provide sets of difference values;

(h) determining, based on the sets of difference values, whether a degree of correlation among the blocks in the group is high or low; and (i) selecting, as encoded data for the group of blocks, the sets of DPCM coefficients provided in step (f) if the degree of correlation is high and the quantized sets of transform coefficients if otherwise.

11. The method according to claim 10, wherein a DPCM coefficient is defined as:

$$D(i,j)=QC(i,j)-QC(i-1,j),$$

wherein D(i,j) represents an i-th DPCM coefficient in a j-th set of DPCM coefficient; QC(i,j) and QC(i−1,j), i-th and (i−1)th rearranged coefficients in a j-th quantized set, respectively; and QC(0,j) has a zero value.

12. The method according to claim 10, wherein a difference value may be defined by an equation selected in the group including $$E(i,j)=|C(i,j)-C(i-1,j)|,$$

$$E(i,j)=\{C(i,j)-C(i-1,j)\}^2,$$

$$E(i,j)=w(j)\cdot|C(i,j)-C(i-1,j)|, \text{ and}$$

$$E(i,j)=w(j)\cdot\{C(i,j)-C(i-1,j)\}^2,$$

E(i,j) being an i-th difference value in a j-th set of difference values, w(j) being a weight factor and C(0,j) being zero.

13. The method according to claim 12, wherein said determining step (h) includes the steps of:

(h1) providing a sum of difference values included in each set, a sum S(j) for a j-th set of difference values being defined as $$S(j) = \sum_{i=1}^{I} E(i,j);$$

(h2) calculating the degree of correlation DEG defined as $$DEG = \frac{1}{K} \cdot \sum_{j=1}^{K} S(j),$$

K being a positive integer equal to or smaller than J;

(h3) comparing the degree of correlation DEG with a predetermined threshold value TH0; and (h4) if DEG is smaller than TH0, determining the degree of correlation to be high and deciding the degree of correlation to be low if otherwise.

14. The method according to claim 12, wherein said determining step (h) includes:

(h5) providing a sum of difference values included in each set, a sum S(j) for a j-th set of difference values being defined as $$S(j) = \sum_{i=1}^{I} E(i,j);$$

(h6) comparing sums S(1) to S(K) with a preset threshold TH1, K being a positive integer not greater than J(=M× N);

(h7) obtaining the number of sums, each of which is smaller than TH1; and (h8) if the number of sums is greater than a preset number, determining that the degree of correlation is high and, if otherwise, determining that the degree of correlation is low.

15. An apparatus for encoding a frame of a video signal, wherein the frame is divided into non-overlapping blocks of M×N pixels and the apparatus includes means for assigning a quantization scale to each block, M and N being positive integers, respectively, the apparatus comprising:

means for arranging P×Q neighboring blocks of an identical quantizer scale assigned into a group of blocks, P and Q being positive integers, respectively;

means for transforming each of the P×Q blocks in the group into a set of M×N transform coefficients, to thereby provide P×Q sets of M×N transform coefficients C(i,j)'s for the group, a transform coefficient representing the one corresponding to a j-th frequency component in an i-th set of transform coefficients and a greater index j representing a frequency component of a higher frequency with i=1, . . . , I(=P×Q) and j=1 to J(=M×N);

means for rearranging the P×Q sets of M×N transform coefficients to generate M×N sets of P×Q rearranged coefficients, the P×Q rearranged coefficients C(i,j)'s included in a j-th set having an identical index j;

means for calculating difference values for each set of rearranged coefficients to provide sets of difference values;

means for quantizing the sets of rearranged coefficients into M×N quantized sets of P×Q rearranged coefficients;

means for DPCM (differential pulse code modulation) coding the sets of quantized sets of rearranged coefficients to provide M×N sets of DPCM coefficients;

means for determining, based on the sets of difference values, whether a degree of correlation among the blocks in the group is high or low; and means for selecting, as encoded data for the group of blocks, the sets of DPCM coefficients if the degree of correlation is high and the sets of transform coefficients if otherwise.

16. The apparatus according to claim 15, wherein a DPCM coefficient is defined as:

$$D(i,j)=QC(i,j)-QC(i-1,j)$$

wherein D(i,j) represents and i-th DPCM coefficient in a j-th set of DPCM coefficient; QC(i,j) and QC(i-1,j), i-th and (i-1)th rearranged coefficients in a j-th quantized set, respectively; and QC(0,j) has a zero value.

17. The apparatus according to claim 15, wherein a difference value may be defined by an equation selected in the group including $$E(i,j)=|C(i,j)-C(i-1,j)|,$$

$$E(i,j)=\{C(i,j)-C(i-1,j)\}^2,$$

$$E(i,j)=w(j)\cdot|C(i,j)-C(i-1,j)|, \text{ and}$$

$$E(i,j)=w(j)\cdot\{C(i,j)-C(i-1,j)\}^2,$$

E(i,j) being an i-th difference value in a j-th set of difference values, w(j) being a weight factor and C(0,j) being zero.

18. The apparatus according to claim 17, wherein said determining method includes:

means for providing a sum of difference values included in each set, a sum S(j) for a j-th set of difference values being defined as $$S(j) = \sum_{i=1}^{I} E(i,j);$$

means for calculating the degree of correlation DEG defined as $$DEG = \frac{1}{K} \cdot \sum_{j=1}^{K} S(j),$$

K being a positive integer equal to or smaller than J;

means for comparing the degree of correlation DEG with a predetermined threshold value TH0; and means for, if DEG is smaller than TH0, determining the degree of correlation to be high and deciding the degree of correlation to be low if otherwise.

19. The apparatus according to claim 17, wherein said determining means includes:

means for providing a sum of difference values included in each set, a sum S(j) for a j-th set of difference values being defined as $$S(j) = \sum_{i=1}^{I} E(i,j);$$

means for comparing sums S(1) to S(K) with a preset threshold TH1, K being a positive integer not greater than J(=M×N);

means for obtaining the number of sums, each of which is smaller than TH1; and means for, if the number of sums is greater than a preset number, determining that the degree of correlation is high and, if otherwise, determining that the degree of correlation is low.

* * * * *